United States Patent [19]

Dirk et al.

[11] Patent Number: 4,859,876
[45] Date of Patent: Aug. 22, 1989

[54] NONLINEAR OPTICAL MATERIALS AND DEVICES

[75] Inventors: Carl W. Dirk, Piscataway; Howard E. Katz, Summit; Salvatore J. Lalama, Clifton, all of N.J.; Kenneth D. Singer, Abington Township, Montgomery County, Pa.; John E. Sohn, Voorhees, N.J.

[73] Assignees: AT&T Bell Laboratories American Telephone and Telegraph Company, Murray Hill; AT&T Technologies, Inc., Berkeley Heights, both of N.J.

[21] Appl. No.: 69,733

[22] Filed: Jun. 19, 1987

Related U.S. Application Data

[63] Continuation-in-part of Ser. No. 776,336, Sep. 16, 1985, abandoned.

[51] Int. Cl.[4] .............................................. G02F 1/00
[52] U.S. Cl. ................................. 307/425; 252/582; 307/427; 372/20; 372/29; 350/96.14; 350/96.34
[58] Field of Search ............................. 307/425, 427; 350/96.14, 96.34, 355; 372/21, 22, 20, 50, 32, 29; 252/582

[56] References Cited

U.S. PATENT DOCUMENTS 4,428,873 1/1984 Murayama et al. ................. 252/583

OTHER PUBLICATIONS

G. R. Meredith et al, "Optical and Nonlinear Optical Characterization of Molecularly Doped Thermotropic Liquid Crystalline Polymers", *Macromolecules*, 1982, 15, 1385–1389.

"Electro-Optical Effects of Azo Dye Containing Liquid Crystalline Copolymers", H. Ringsdorf, et al., *Makromol. Chem.* 185, 1327–1334, (1984).

"Electrochromism of Substituted Polyalkylenes in Polymer Matrices; Influence of Chain Length on Charge Transfer", E. E. Havinga et al, *Ber. Bunsenges. Phys. Chem.* 83, 816–821, (1979).

"Characterization of Liquid Crystalline Polymers for Electro-optic Applications", G. R. Meredith et al., Nonlinear Optical Properties of Organic and Polymeric Materials, D. J. Williams, Editor, (ACS, Washington, D.C.), 1983.

"Organic Polymer and Non-Polymeric Materials with Large Optical Nonlinearities", D. J. Williams, *Angew. Chem. Int. Ed. Engl.* 23, (1984), 690–703.

*Primary Examiner*—James W. Davie
*Attorney, Agent, or Firm*—Bruce S. Schneider; Joel F. Spivak

[57] ABSTRACT

An electrooptic or optical parametric device comprises a noncrystalline second order optically nonlinear element and means for providing an optical input to and an optical output from said element wherein said element comprises an organic molecule having second order optical susceptibility incorporated in a directionally oriented manner in an optically clear glassy polymer. When said device is employed in an electrooptic mode it includes means for applying an electric field and/or optical input to said element for altering an optical property thereof.

40 Claims, 2 Drawing Sheets

NONLINEAR OPTICAL MATERIALS AND DEVICES

CROSS REFERENCE TO RELATED APPLICATION

This application is continuation-in-part of copending application, Ser. No. 776,336, filed Sept. 16, 1985, now abandoned.

TECHNICAL FIELD

This invention relates to nonlinear optical devices such as electrooptic modulators and switches, frequency converters, optical parametric oscillators and amplifiers, data processors and optically nonlinear materials useful in such devices.

BACKGROUND OF THE INVENTION

Electrooptical modulators, switches and optical parametric devices based upon the nonlinear optical properties of materials are known in the art. Generally, these devices have utilized inorganic crystals, e.g., $LiNbO_3$ as the optically nonlinear media. More recently, organic crystalline materials, e.g., 2-methyl-4-nitroaniline, have been shown to have a figure of merit as an optically nonlinear active material which is gretaer than that of $LiNbO_3$. In addition, due to the electronic states associated with the effect, the organic crystalline materials not only have large intrinsic second order nonlinear optical susceptibilities, but potentially possess very fast switching times. Further, associated with such second order nonlinear optical effect is a linear electrooptical effect.

One problem, however, in obtaining an optically nonlinear medium for device application of the type previously described is the difficulty in providing uniform crystalline structures, and then films of such materials in a manner to be suitable for integrated devices. We have now developed electrooptic and optical parametric devices and optically nonlinear media used therein which do not use or require crystalline structures.

SUMMARY OF THE INVENTION

An electrooptic or optical parametric device comprises a noncrystalline second order optically nonlinear element and means for providing an optical input to and an optical output from said element wherein said element comprises an organic moiety having second order optical susceptibility incorporated in a directionally oriented manner in an optically clear glassy polymer. When said device is employed in an electrooptic mode it includes means for applying an electric field and/or optical input to said element for altering an optical property thereof.

DETAILED DESCRIPTION

Figure 1:
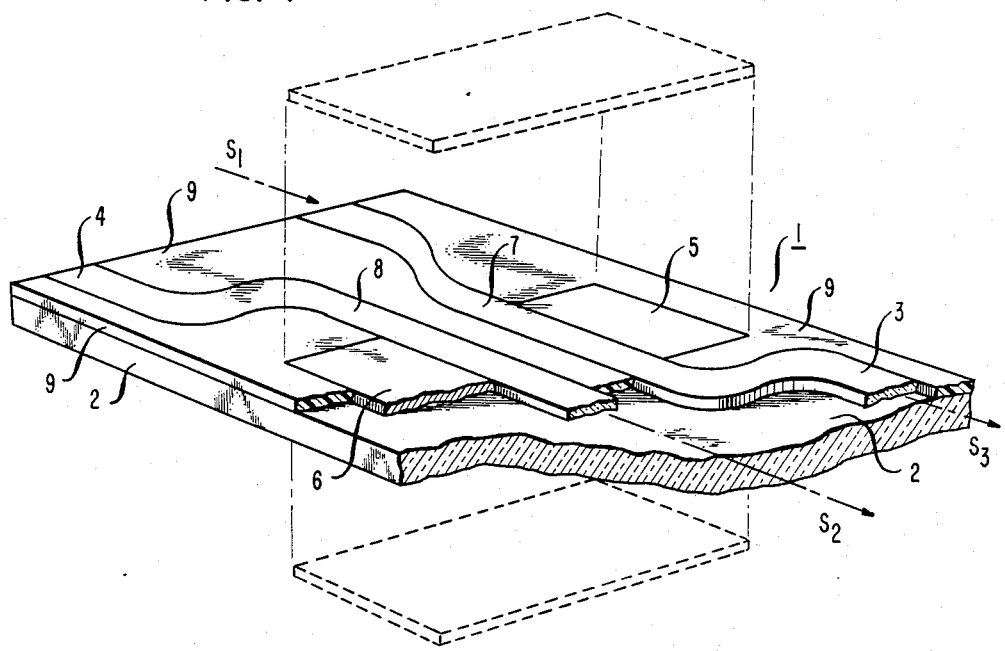
FIG. 1 is an elevational partially cross-sectional view of an electrooptical directional coupler or switch.

The heart of any optically nonlinear device is the nonlinear optical medium employed therein. We have found that in order to take advantage of large microscopic susceptibilities of many non-centrosymmetrical organic molecules (i.e., molecules which do not possess a point of symmetry) in macroscopic devices, one may construct a noncrystalline medium comprising the non-centrosymmetric organic molecule having a non-zero second order optical susceptibility incorporated in an essentially optically clear glassy polymer in an ordered or directionally aligned arrangement of the organic molecules. That is, where the dipoles of the molecules are aligned in generally the same direction so as to result in a net dipole moment as opposed to a random ordering of the molecules in the polymer wherein the dipole moments of the individual molecules essentially cancel each other out. Such second order nonlinear optical media can be prepared directly on a desired substrate or can be made as a free film or tape. It may be noted that this optically nonlinear media can be utilized as an optical waveguide as well as in electrooptic and optical parametric devices.

The term, essentially optically clear polymer, as used herein, refers to a polymer wherein the attenuation at the operating frequency is sufficiently small so as to allow for a commercially operable and feasible device. Typically, such attenutations should be no more than 1 dB/cm. The operating frequencies of the novel devices typically include frequencies ranging from the ultraviolet through the infrared portions of the electromagnetic spectrum, depending upon the absorption spectra of the particular polymer host as well as the absorption and second order nonlinear susceptibility of the organic molecule in the host at any particular wavelength. We believe that any organic molecule which is capable of being incorporated in a glassy polymer host so as to result in an essentially optically clear member and which further has a dipole moment which allows molecules to be directionally aligned in the host by means of an applied electric field so as to re result in a net dipole moment and which further exhibits a second order nonlinear optical susceptibility is suitable for forming the optical medium of the device. Of course, as will be hereafter shown, some mateial have a much higher figure of merit for use in such devices than others. The figure of merit is generally a function of the molecular nonlinear optical susceptibility, $\alpha$, the dipole moment, $\mu$, the concentration of the optically nonlinear moiety per unit volume and the ability to align the moeity within the polymer so as to obtain as high a net dipole moment as possible.

Generally, in electrooptic devices, there is electrical control of the direction, phase, frequency and/or amplitude of lightwave signals. In one class of optical and parametric devices there is mixing of two optical input signals to generate to optical output signals whose frequencies are the sum or difference of the two input frequencies and whose amplitudes are related to the input amplitudes. One example of such a device is an optical parametric amplifier wherein energy in a pump beam is transferred to a signal beam in phase therewith. In another class of optical parametric devices, one input beam is converted to one output beam whose frequency is twice that of the input beam. Further, the novel devices can be integrated with electronic devices on a semiconductor chip or laser or other solid state device to form a monolithic optical or electrooptical semiconductor device. Examples of such devices are described below.

Referring to FIG. 1 there is shown an elevational partially cross-sectional representation of an electrooptical directional coupler or switch 1. In accordance with FIG. 1, the coupler 1 comprises a substrate 2, e.g., glass, quartz or a dielectric coated semiconductor, a pair of spaced channel waveguides 3 and 4 on one surface of the substrate 2 and a pair of elelctrodes 5 and 6, one electrode associated with and contiguous to each channel waveguides 3 and 4, respectively. There is a central region 7 and 8 of each channel waveguides 3 and 4, respectively, where they are parallel to each other and where the spacing between waveguides is smallest. Typical spacing in this region is from 5 $\mu$m to 20 $\mu$m. Further, the electrodes 5 and 6 are positioned adjacent to the waveguide in this narrowly spaced region so as to maximize the electric field developed across the waveguides upon application of a voltage to the electrodes. Alternatively, as shown by the dotted lines, one may employ a single top electrode over the waveguides and a bottom electrode below the waveguides to enhance the field for a given applied voltage. In addition, the device may contain a protective polymer overcoat 9. e.g., a clear epoxy, siloxane or acrylate polymer, to protect the waveguides 3 and 4. Such protective layers may also function to confine the optical wave within the optical waveguide. The electrooptic waveguides 3 and 4 which are about 2 $\mu$m thick are comprised of an optical quality glassy polymer host having doped therein a directionally ordered array of non-centrosymmetric polar organic molecules as hereinafter described which exhibit second order optical suceptibility in response to an applied field.

In operation of the device, light, preferably from a monochromatic single mode source, e.g., a laser, is inputted into one area of the upper channel waveguide 3, e.g., as designated by $S_1$. In the absence of any applied field, the electromagnetic field extends beyond the confines of the waveguide 3 a distance which is greater than the gap distance between the parallel portions of the upper and lower waveguides and penetrates the lower waveguide 4 and is propagated therethrough as well. If the length of the parallel portions of the waveguide is selected such that an antinode exists at the point of the lower waveguide 4 where the waveguides 3 and 4 start to deviate, the light (electromagnetic waves) will essentially be emitted from the lower waveguide at $S_2$. This is the crossover or switched configuration.

Upon applying of an appropriate voltage by means of the electrodes across the parallel waveguides, the electrooptical effect produced thereby causes the light to be transmitted directly in the upper waveguide and exit as shown by $S_3$. The voltage causing the maximum straight-through transmission is given by $$U = \frac{\sqrt{3d\lambda}}{2\alpha n^3 rL}$$

where U is the applied voltage, $\lambda$ is the wavelength, n index of refraction of the waveguide, r the electrooptic coefficient of the waveguide, d the waveguide separation distance, L the length of the narrowly spaced parallel portios, and $\beta$ the overlap integral between applied electric field and the optical field in the waveguide.

Figure 2:
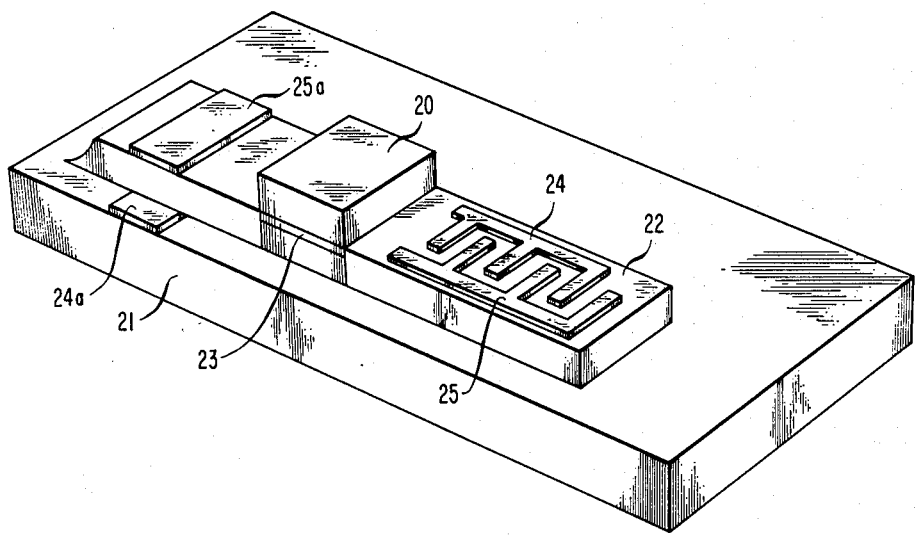
FIG. 2 is an elevational view of an integrated solid state laser tuner and frequency stabilizer.

FIG. 2 shows an integrated laser tuner and frequency stabilizer using the electrooptic medium described herein. Here, a junction or injection laser 20 is grown on a semiconductor substrate 21, e.g., a GaAs laser on a GaAs substrate. A 1-3 $\mu$m thick electrooptic film 22 lies adjacent and contiguous with the lasera junction 23 to provide a waveguide for the light emitted at the junction 23. The film 22 is provided with opposing electrodes 24 and 25, on one surface thereof, as shown, or on opposite surfaces, i.e., one electrode 24a between the film and the substrate and one electrode 25a on the top surface of the film so as to provide means for applying an electric field within the electrooptical film 22. Alternatively, electrode 25a can be a highly doped portion of the substrate 21. The electrooptical effect of the film under an applied field results in a tunable filter or frequency stabilizer for the laser output.

Figure 3:
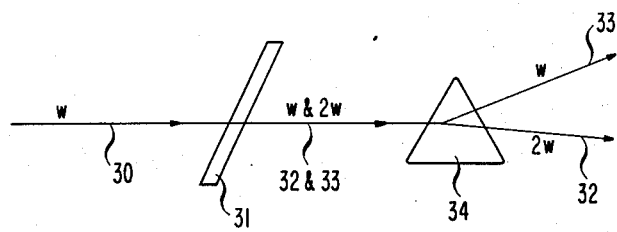
FIG. 3 is a diagrammatic representation of a device for generating second harmonic frequencies.

FIG. 3 shows the opticall nonlinear medium used in an optical parametric device for second harmonic frequency generation. Here, an incident light beam 30 at frequency $\omega$ impinges upon the optically nonlinear film 31. Due to the nonlinear optical properties of the film 31, two colinear beams 32 and 33 are emitted, one at the same frequency, $\omega$ and one at twice the frequency, 2 $\omega$. The emerging colinear beams 32 and 33 may be passed through a prism 34 to spatially separate the two wavelengths 32 and 33. The beam 32 at 2 $\omega$ is now available to be used. Such a device may also be constructed so that the optical waves are guided within the polymer. Alternatively, one can eliminate the prism so that the output beams are coincidental. If the original beam is in the near infra-red region, a beam at 2 $\omega$ may be created in the visible portion of the spectra. This can enable visible control of the coincidental infra-red beam which may have particular use in apparatus for infra-red surgery, infra-red cutting devices and the like. In general, the operation of optical parametric devices is optimized when all of the optical waves propagate with the same velocity.

Figure 4:
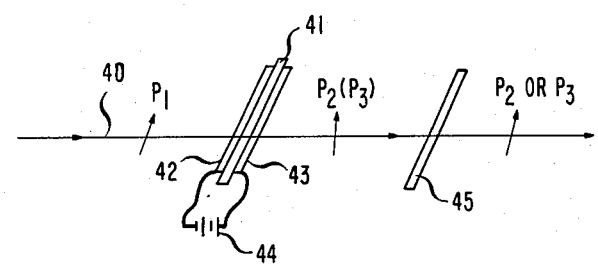
FIG. 4 is a diagrammatic representation of an electrooptic phase/intensity modulator.

FIG. 4 shows the use of the electrooptic film in an electrooptic phase/intensity modulator. Here, incident light 40 having a polarization $P_1$ is passed through the electrooptic film 41 which is provided with transparent electrodes 42 and 43 on opposing surfaces of the film 41. Upon passing through the film, the natural birefringence of the film causes a change of polarization of the light to $P_2$. When a voltage is applied to the film by means of a voltage source 44 applied across the electrodes 42 and 43, an electric field is generated within the film 41. Through the linear electrooptical property of the film 41, the electric field causes a change in the film's index of refraction, thereby altering the birefringence. This, in turn causes the emitted light to have yet a different polarization, designated as $P_3$. Thus, a polarization modulation between the values $P_2$ and $P_3$ can be achieved by the periodic applications and/or removal of the voltage to the film 41. An intensity modulation can be achieved by placing a polarizer 45 at the output beam which is oriented to allow the passage of either $P_2$ or $P_3$ but not both. It should be noted that the nonlinear optical film of the devices of FIGS. 4 and 5, in practice, are preferably deposited on a substrate.

Figure 5:
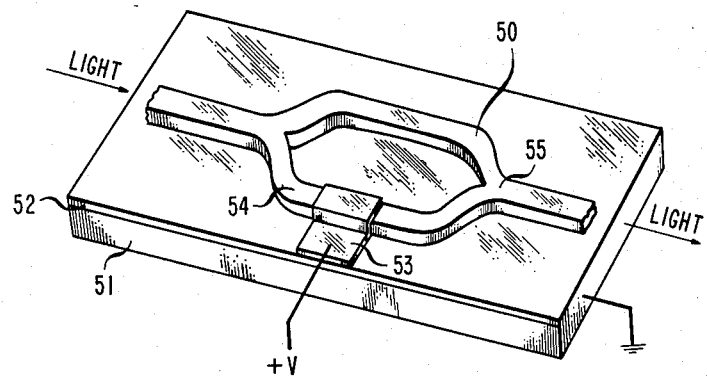
FIG. 5 is an elevational view of an electrooptical guided wave intensity modulator.

FIG. 5 shows a guided wave electrooptic intensity modulator employing an electroptic material as described here. Here, a film 50 of the electrooptic material is formed on a conductive substrate 51 having an insulative coating 52. The film 50 has a Mach-Zehnder two-arm interferometric waveguide structure. A top electrode 53 is placed on one arm 54 of the interferometer.

The substrate is kept at ground potential. As voltage is applied to and removed from across the arm 54 by means of top electrode 53 and conducting substrate 51, an electric field is produced in the arm 54 of the interferometer. This field changes the index of refraction of the material due to the linear electrooptic effect possessed by the film 50. This results in an effective change in optical path length in arm 54 of the interferometer relative to the other arm which, in turn, produces either constructive or destructive interference of the light at the recombination point 55. As the voltage is modulated so as to alternate between constructive and destructive conditions, the output intensity exhibits a maximum and minimum value, respectively.

The second order nonlinear optical medium useful for the above mentioned and other electrooptic and optical parametric devices comprises a glassy polymer which is essentially optically clear at the wavelength of intended use having incorporated therein for example via dissolution or covalent attachment, a non-centrosymmetric organic molecule which exhibits a non-zero second order optical susceptibility, $\beta$, in an ordered (directionally aligned) arrangement so as to result in a net dipole moment in the polymer. Since the magnitude of the effect is, to a good approximation, a linear function of the concentration of the organic molecule in the polymer, it is advantageous to utilize a system where the organic molecule is highly soluble within or covalently attached to the glassy polymer host. Also, generally, the higher $\beta$ and the higher the net dipole moment, for a given attenuation of the operating frequency, the more sensitive the optical medium.

While many non-crystalline, glassy polymers may be suitable hosts, non-crystalline polymers or acrylates, methacrylates, epoxies, styrene and polycarbonate, we have found thus far that polymethylmethacrylate is generally preferred as the polymeric host material for the specific classes of nonlinear organic molecules investigated. Generally, the useful polar molecules may be defined as those having an electron withdrawing group and an electron donating group coupled through a conjugating $\pi$ electron system linkage. Typical electron withdrawing groups include unsaturated heterocyclics and radicals such as CN, C=O or other election withdrawing groups as set forth herein.

Examples of suitable non-centrosymmetric organic molecules which may be dissolved in the polymer are represented by the formulas:

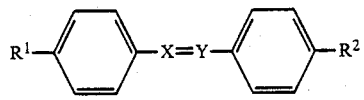

wherein X and Y are selected from the group consisting of carbon and nitrogen;
R$^1$ is a strong electron withdrawing group as known in the art, e.g.,

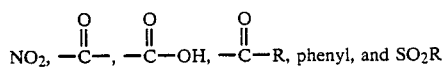

where R is an organic radical
and R$^2$ is an electron donating or neutral group, e.g.,

where R$_x$ and/or R$_y$ are selected from hydrogen and an alkyl group or derivative thereof such as —C$_2$H$_5$, —C$_2$H$_4$OH, C$_3$H$_7$, etc. There may also be ring substitutions of the compounds. It should be understood that these compounds are merely representative of suitable non-centrosymmetric organic compounds useful in the practice of the invention and are not limiting. In practice, it is advantageous to incorporate the maximum amount of active nonlinear optic compound as can be dissolved and oriented in the glassy polymer matrix in order to maximize the bulk second order nonlinear optical effect. Hence, the particular polymer most suitable with any specific nonlinear optical compound may depend upon the solubility of the compound in the polymer, which can easily be determined.

A particularly suitable system appears to be the azo dye, disperse red 1 wherein R$^1$ is NO$_2$ and R$^2$ is

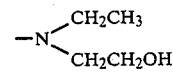

dissolved in polymethylmethacrylate (PMMA) or where it is directly or indirectly covalently bonded to the polymer host, e.g. via the oxygen atom of the ethanol amine moiety, to a concentration of typically up to 15 or more weight percent. Other compounds which are expected to give similar results in PMMA or other acrylate based polymers, e.g., polyethylacrylate, polymethylacrylate and polyethylmethacrylate are those where R$^1$ is —NO$_2$ and R$^2$ is either NH$_2$ or NR$_2^3$ where R$^3$ are alkyl groups such as CH$_3$, C$_2$H$_5$, C$_3$H$_7$ or the like or one such alkyl group and a hydrogen atom. The azo dyes such as disperse orange 3 have also been found to be suitable in an epoxy host.

Other particularly suitable non-symmetrical polar molecules useful as the active component of the non-linear media may be represented by the structural formulae:

A
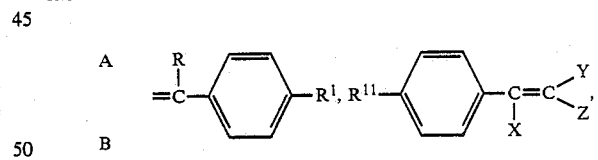

B
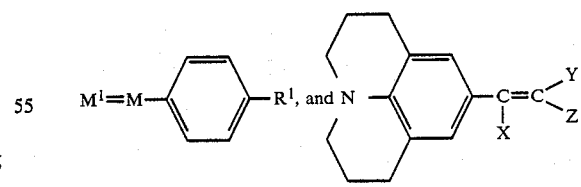

wherein
(a) R is hydrogen or an alkyl group;
(b) R$^1$ is hydrogen or preferably an electron withdrawing group, e.g.,

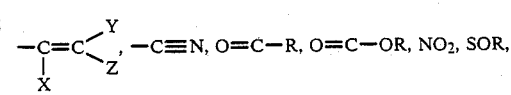

halogen or an alkyl group, e.g., methyl, ethyl and propyl;

(c) A and B are selected from O, N, S, Se, Te and carbon where both A and B are not carbon and wherein the cyclic ring may be unsaturated, partly saturated or saturated having from 5 to 8 members in the ring and is electron donating in nature.

(d) X, Y and Z are selected from the same groups as set forth with respect to $R^1$, provided they are not all hydrogen atoms;

(e) $R^{11}$ is an electron donating group, e.g., an amine or an amide, OR, SR, hydrazine, alkylamine and a substituted alkylamine;

(f) M is selected from carbon and nitrogen;

(g) $M^1$ is selected from $CR^{111}$, $NR^{111}$ and $C-C=C-R^{111}$ wherein $R^{111}$ is selected from an aromatic group and an aromatic group having an $R^{11}$ substitution.

It should be understood that substituted homologues of these compounds can also be used and are included herein.

Examples of compounds which have been found to be suitable in the manufacture of the devices described herein are found in the table. The table lists specific molecules as well as the value of $\beta\mu$ in units of $10^{-30} cm/^5 D/esu$, $\beta$ and $\beta_o$ in units of $10^{-30} cm^5/esu$ and $\mu$ in units of Debye, D. Measurements of $\beta$, which is wavelength dependent were made at 1.356 $\mu$m for all compounds except compounds A, Q and R which were measured at a wavelength of 1.58 $\mu$m. The values were determined by dissolution of the compound in either p-dioxane or dimethylsulfoxide at concentrations of from $5 \times 10^{-2} M$ to $4 \times 10^{-3} M$. Dipole moments were determined by measuring the differential capacitance as a function of concentration at 1 kHz.

$\beta$ is the projection of the vector part of the nonlinear optical susceptibility of the molecule on the ground state dipole moment. $\beta_o$ is a measure of the nonlinear optical susceptibility that minimizes the effect of the various excited state energies from molecule to molecule and is a measure of the molecular susceptibility normalized with respect to wavelength. $\mu$ is the molecular dipole moment. $\beta\mu$ represents the figure of merit which one would expect for a molecule which is poled or directionally oriented in a polymer host.

TABLE 1

Linear and nonlinear optical properties, dipole moment, and first excited state energy of molecules studied in this work.

| Molecule | $\beta\mu$ | $\beta$ | $\beta_o$ | $\mu(D)$ |
| --- | --- | --- | --- | --- |
| A | 75 | 12 | 9 | 6.3 |
| B | 138 | 21 | 12 | 7.1 |
| C | 358 | 52 | 25 | 6.9 |
| D | 102 | 15 | 9.5 | 6.5 |
| E | 271 | 31 | 16 | 8.7 |
| F | 846 | 78 | 26 | 10.9 |

TABLE 1-continued

Linear and nonlinear optical properties, dipole moment, and first excited state energy of molecules studied in this work.

| Molecule | | $\beta\mu$ | $\beta$ | $\beta_o$ | $\mu(D)$ |
|---|---|---|---|---|---|
| G | (structure: julolidine with =C(CN)₂ dicyanovinyl group) | 730 | 72 | 19 | 10.2 |
| H | (structure: (H₃C)₂N–C₆H₄–CH=CH–C₆H₄–NO₂) | 760 | 105 | 52 | 7.2 |
| J | (structure: (H₃CH₂C)(HOH₂CH₂C)N–C₆H₄–N=N–C₆H₄–NO₂) | 1090 | 125 | 47 | 8.7 |
| K | (structure: (H₃C)₂N–C₆H₄–N=CH–C₆H₄–NO₂) | 500 | 77 | 37 | 6.6 |
| L | (structure: H₂N–C₆H₄–N=N–C₆H₄–NO₂) | 770 | 103 | 47 | 7.5 |
| M | (structure: (H₃C)₂N–C₆H₄–CH=CH–C₆H₄–CH=C(CN)₂) | 2650 | 323 | 133 | 8.2 |
| N | (structure: (H₃C)₂N–C₆H₄–CH=CH–CH=CH–C₆H₄–CH=C(CN)₂) | 1320 | 167 | 73 | 7.9 |
| P | (structure: H₂N-naphthalene-NO₂) | 233 | 45 | | 5.2 |
| Q | (structure: (H₃CH₂C)₂N–C₆H₄–N=N–C₆H₄–C(CN)=C(CN)₂) | 4110 | 390 | 154 | 10.5 |
| R | (structure: 1,3-dithiole=CH–C₆H₄–C(CN)=C(CN)₂) | 1200 | | | |

In all cases, the active non-centrosymmetric organic material must be directionally oriented in the polymer An example of the preparation of a suitable nonlinear optical film is as follows. The polymer, e.g., PMMA, is dissolved in a suitable solvent and filtered through a sub-micron sized filter. Suitable solvents for PMMA are chloroform, DMSO, methylene chloride, chlorobenzene, acetone, 1,2-dichloroethane, 2-butanone, ethyl or methyl cellosolve and cellosolve acetate. The optically nonlinear material, if not already bonded to the polymer, is dissolved in the polymer-solvent solution. For the azo dye, disperse red 1, the concentration of the dye in the polymer is preferably about 15%. The substrate upon which the optically nonlinear film is to be prepared is thoroughly cleaned, preferably in a dust free atmosphere. Typical substrates are glass, quartz, aluminum, phosphorous doped oxide on silicon wafers, thermal oxide coated silicon wafers, and conductive indium-tin oxide-coated glass. A suitable substrate cleaning procedure employs an immersion in a heated solution comprising $H_2O$, $NH_4OH$ and $H_2O_2$ in a volume ratio of 10:2.5:2 followed by a rinse with conductivity grade water and drying in an inert atmosphere.

The substrate is then coated with the solution of the nonlinear optical material in the polymer such as by means of spin coating of 1 $\mu$m thick film on the substrate and removing the solvent by baking. Thicker films, e.g., up to 5 $\mu$m may be prepared by multiple coatings followed by baking after each coating. For films in the 25 $\mu$m to 200 $\mu$m thick range multiple coatings of about 25 $\mu$m per coating may be achieved by spray coating or doctor blading. It may be noted that by techniques well known in the art, high quality photoresist patterns can be applied to unmetalllized films to form films having feature sizes of for example 4–50 $\mu$m, which may be useful in some of the novel devices previously described. In order to pole or orient the active optically nonlinear molecules in the deposited film, it is preferred that the substrate have provided a conductor on the surface on which the optically nonlinear film is to be deposited or a buffer layer on which the film is to be deposited. This conductor can be a transparent tin oxide, indium oxide or indium tin-oxide conductor or a transparent or non-transparent metallic conductor deposited for example by sputtering. A top conductor is formed over the deposited film such as by sputtering a thin (100–1000 Å) gold layer on the deposited film.

The film sandwiched between electrodes is then raised about 5°–40° C. above the glass-rubber transition temperature of the polymer by slow heating. For example, the disperse red azo dye in PMMA is heated at a rate of 5–15° C./minute to a temperature of from 115°–130° C. After heating, a poling voltage which aligns the optically nonlinear molecules in the polymer, is applied across the film and maintained for from 1–10 minutes. The voltage applied depends upon the film thickness. A D.C. voltage which creates a field of at least about $1 \times 10^6$ V/cm is desirable. Subsequently, the film is slowly cooled at a rate of about 10° C./minute and annealed for 5–15 minutes at a temperature just below the glass transition temperature (approximately 90° C. for the azo dye in PMMA). After annealing, it is slowly cooled to room temperature at about 15° C./minute and the poling voltage is removed. The slow heating, cooling, and annealing is to prevent defects from arising, minimizing or eliminating strain and minimizing free volume in the film. The top electrode layer may then be removed by abrasion or other means or it may be left on. Also the film may be patterned as previously mentioned by standard photoresist-etch techniques.

This is but one example of how the optical media useful in the novel devices may be prepared. Other techniques which will be apparent to those skilled in the art may be employed. For example, the top electrode need not be applied directly to the film and may be held immediately adjacent to but spaced from the film. While this would require a higher applied voltage for poling due to the increased distance between electrodes, the oriented film may be prepared while evaporating a solvent, polymerizing or melting the polymer to deposit it without subsequently heating the polymer above its transition temperature.

For use in a second harmonic generator, the film is typically applied to a transparent indium tin oxide conductor on a glass substrate and the top electrode is a transparent sputtered gold electrode. For use in a directional coupler, the film is typically deposited on a thermal oxide coated silicon wafer and its top surface is metallized by sputtering 2000–3000 Å of Al on the film.

What is claimed is:

1. An optical device comprising a non-crystalline second order optically nonlinear element, means for providing an optical input to and an optical output from said element wherein said element comprises an organic compound having a second order optical susceptibility incorporated in a directionally oriented manner in an optically clear glassy polymer so as to impart a net second order optical susceptibility to said element.

2. An optical device as recited in claim 1 including means for applying an electric field to said element for altering an optical property thereof.

3. The device recited in claim 1 wherein the element is a film on a substrate.

4. The device recited in claim 3 wherein the film is from 1 $\mu$m to 200 $\mu$m in thickness.

5. The device recited in claim 1 wherein the organic compound is dissolved in said polymer to about the limit of its solubility therein.

6. The device recited in claim 1 wherein the organic compound is represented by the formula

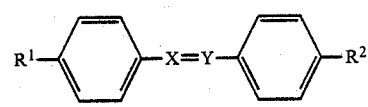

wherein X and Y are selected from nitrogen and carbon, $R^1$ is a strong electron withdrawing group and $R^2$ is an electron donating or neutral group.

7. The device recited in claim 6 wherein $R^1$ is selected from a member of the group consisting of

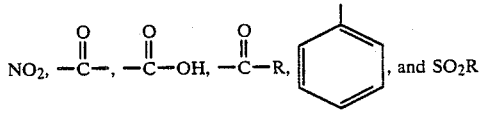

where R is an organic radical, and wherein $R^2$ is

wherein $R_x$ and $R_y$ are selected from the group consisting of hydrogen, an alkyl group and an alkyl derivative.

8. The device recited in claim 6 wherein the polymer is selected from a member of the group consisting of polymethacrylates, polyacrylates, epoxy, polystyrene and polycarbonate.

9. The device recited in claim 1 wherein the organic molecule is dispersed red 1 azo dye and the polymer is polymethylmethacrylate.

10. The device recited in claim 1 wherein the organic compound is covalently bonded to said polymer.

11. The device recited in claim 1 wherein the organic compound is at least one member of the group consisting of

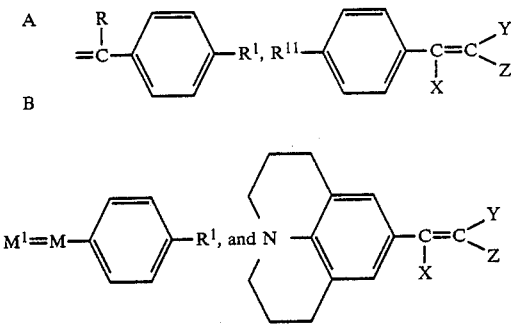

wherein
(a) R is selected from the group consisting of hydrogen and an alkyl,
(b) $R^1$ is selected from the group consisting of

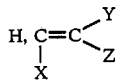

C≡N, O=C—R, O=C—OR, NO$_2$, SO$_2$R, PO$_2$R$_2$, PO(OR)$_2$, a halogen and an alkyl, (c) A and B are selected from the group consisting of O, N, S Se, Te and C where both A and B are not carbon and wherein the cyclic ring incorporating A and B has from 5 to 8 members and is electron donating in nature and may be saturated, partially saturated or unsaturated, (d) X, Y and Z are selected from the group consisting of H, C≡N, O=C—R, O=C—OR, NO$_2$, SO$_2$R, PO$_2$R$_2$, PO(OR)$_2$, halogen and an alkyl provided all three are not hydrogen atoms, (e) $R^{11}$ is an electron donating group selected from the group consisting of amines, amides, OR, SR, hydrazine, alkylamines and substituted alkylamines, (f) M is selected from the group consisting of C and N, (g) $M^1$ is selected from the group consisting of $CR^3$, $NR^3$ and $C—C=CR^3$ wherein $R^3$ is selected from an aromatic group and an aromatic group having an $R^{11}$ substitution.

12. The device recited in claim 11 wherein the organic compound is

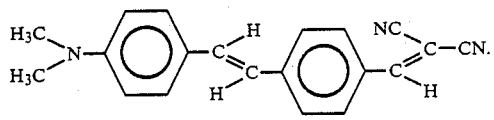

13. The device recited in claim 11 wherein the organic compound is

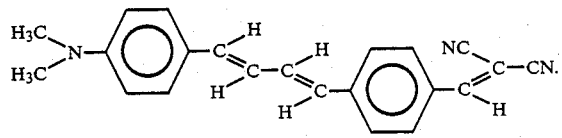

14. The device recited in claim 11 wherein the organic compound is

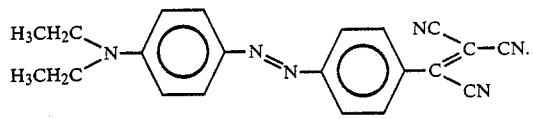

15. The device recited in claim 11 wherein the organic compound is

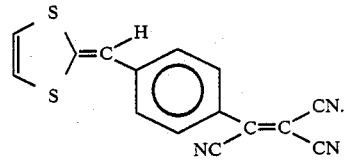

16. An electrooptical directional coupler or switch comprising an electrooptically active film on a substrate, said film comprising an organic compound having its molecules directionally oriented in an optically clear, glassy, polymer host, said compound having second order optical susceptibility and means for applying an electrical field to said film for altering an optical property thereof, said film being present on said substrate in the form of two separated arms having a closely spaced, parallel central region from which the arms diverge on each side of said region, the spacing between arms and arm lengths of said central region being such that light of a given wavelength passing through one arm can be coupled to the other arm and emitted therefrom in the absence of an applied field and such emission from said other arm can be reduced or eliminated upon the application of an electric field to said arms and including means for providing an optical input to one of said arms and means for detecting an optical output.

17. The device recited in claim 16 wherein the means for applying an electric field comprises spaced electrodes said electrodes being in the same plane as and adjacent each of said arms in the central region thereof.

18. The device recited in claim 16 wherein the means for applying an electric field comprises at least one spaced electrode pair consisting of an electrode below and an electrode over said film in the central region thereof.

19. An integrated injection laser tuner and frequency stabilizer comprises a p-n junction laser grown on a semiconductor substrate, an optical waveguide on said substrate contiguous with and extending from the laser junction, said waveguide comprising a film having a non-centrosymmetric molecule of an organic compound which exhibits a second order optical susceptibility incorporated in a directionally oriented manner in an optically clear glassy polymer host, means for applying an electric field to said wavelength film for tuning or stabilizing the output of said laser.

20. A second harmonic generator comprising means for passing light of one frequency through a second order nonlinear optical element so as to produce a coincidental wave of a second frequency which is twice the original frequency wherein said optical element comprises an optically clear, glassy polymer host having dissolved therein in directional alignment, molecules of an organic compound having second order optical susceptibility.

21. The device recited in claim 20 wherein the means for splitting the coincidental beams is a prism.

22. The device recited in claim 20 wherein the nonlinear optical element is a film deposited on an optically clear substrate.

23. The second harmonic generator recited in claim 20 including means for splitting the coincidental waves to allow one to extract said second frequency wave independent of the original frequency.

24. An electrooptical phase modulator comprising means for passing light of a first phase through a transparent linear electrooptic element and means for applying an electric field to said element sufficient to cause a phase change in the incident light passing therethrough to create light of a second phase, wherein said element comprises an optically clear glassy polymer host having dissolved therein directionally oriented molecules of an organic compound having second order optical susceptibility.

25. The modulator recited in claim 24 including a polarizer situated in the light path after said electrooptic element which allows light of either said first phase or said second phase, but not both, to pass therethrough.

26. An electrooptic amplitude modulator comprises an interferometric waveguide of a material having a second order optical susceptibility incorporated in a directionally oriented manner in an optically clear glassy polymer, means for applying an electric field to an arm of said waveguide to change the index of refraction of said arm, means for providing an optical input to said waveguide and means for detecting an optical output from said waveguide, the intensity of said output being dependent upon the field applied to said arm of said waveguide.

27. The modulator recited in claim 26 wherein said interferometer is of the Mach-Zehnder type and wherein the waveguide is a thin film deposited on a conductive substrate having an insulating layer between said waveguide film and said conductive substrate and one arm of said film having an electrode thereover such that a voltage can be applied between the substrate and said electrode.

28. A second order optically nonlinear optical element comprises an organic compound having second order optical susceptibility incorporated in an optically clear glassy polymer such that the molecules of said compound are directionally oriented therein.

29. The optical element recited in claim 28 wherein said element comprises a film of said polymer.

30. The optical element recited in claim 29 wherein said film is adherent upon an optically clear substrate.

31. The optical element recited in claim 30 wherein the film is from 1 $\mu$m to 200 $\mu$m in thickness.

32. The optical element recited in claim 28 wherein the organic compound is dissolved in said polymer to about the limit of its solubility therein.

33. The optical element recited in claim 28 wherein the organic compound is represented by the formula

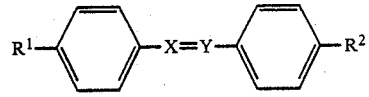

wherein X and Y are selected from nitrogen and carbon, $R^1$ is a strong electron withdrawing group and $R^2$ is an electron donating or neutral group.

34. The optical element recited in claim 33 wherein $R^1$ is selected from a member of the group consisting of

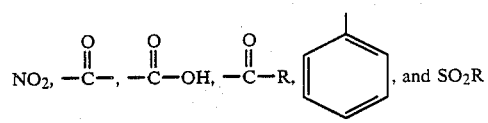

where R is an organic radical and $R^2$ is

wherein $R_x$ and $R_y$ are selected from the group consisting of hydrogen and an alkyl group.

35. The optical element recited in claim 33 wherein the polymer is selected from the group consisting of polymethacrylates, polyacrylates, epoxy, polystyrene and polycarbonate.

36. The optical element recited in claim 28 wherein the organic molecule is disperse red 1 azo dye and the polymer is polymethylmethacrylate.

37. The optical element recited in claim 29 including means for applying a voltage across said film.

38. The optical element recited in claim 37 wherein said voltage means comprises at least one pair of spaced electrodes, at least one of said electrodes being on a surface of said film.

39. The optical element recited in claim 28 wherein said compound is covalently bonded to said polymer.

40. An optical device comprising a non-crystalline second order optically nonlinear element, means for providing an optical input to and an optical output from said element wherein said element comprises an organic compound having second order optical susceptibility incorporated in a directionally oriented manner in an optically clear glassy polymer so as to impart a net second order optical susceptibility to said element wherein the organic compound is represented by the formula

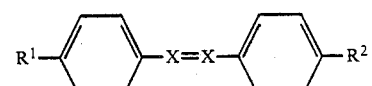

wherein X represents an atom selected from nitrogen and carbon, $R^1$ is a strong electron withdrawing group and $R^2$ is an electron donating or neutral group.

* * * * *

UNITED STATES PATENT AND TRADEMARK OFFICE
CERTIFICATE OF CORRECTION

PATENT NO. : 4,859,876

DATED : August 22, 1989

INVENTOR(S) : C. W. Dirk, H. E. Katz, S. J. Lalama, K. D. Singer, J. E. Sohn

It is certified that error appears in the above-identified patent and that said Letters Patent is hereby corrected as shown below:

Column 1, line 38 "then" should read --thin--.
Column 2, line 42 "re result" should read -- result-. Column 2, line 46, "mateial" should read --materials--. Column 2, line 49, "$\alpha$" should read --$\beta$--.
Column 2, line 58 "to" should read --two--. Column 3, line 65, "portios" should read --portions--. Column 3, line 65 "$\beta$" should read --$\alpha$--.
Column 4, line 4, "lasera" should read --laser--. Column 4, line 63 "electroptic" should read --electrooptic--. Column 6, line 36, "$NR_2^3$" should read --$NR_2^3$--. Column 6, line 46, "$_B^A$" should read --$(_B^A)$--.
Column 8, line 5, "cm/$^5$" should read --cm$^5$--. Column 9, last line, after the word polymer insert --matrix. This orientation is accomplished by poling the molecules in the polymer under the influence of an electric field under conditions where the polymer is fluid (e.g., above its glass transition temperature or mixed with a solvent therefor or is in the form of a monomer, oligimer or partially polymerized state and is polymerized in situ in the presence of the orienting field. The field is retained until the polymer film hardens by reducing the temperature, evaporating the solvent or completing polymerization as the case may be. Upon hardening, the oriented active molecules remain in their ordered position in the polymer. Unoriented films do not exhibit the second order nonlinear optical properties of the oriented films due to cancellation of the microscopic molecular effects on a macroscopic level caused by random orientation of the molecules. The greater the molecular dipole moment, the easier and/or greater degree of orientation achievable. It should also be possible to achieve an ordered film under an electric field applied across the active molecule dissolved in a liquid monomer which is spread on a substrate to form a film and polymerized in situ.--
Column 11, line 25 "of 1" should read --a 1--.

UNITED STATES PATENT AND TRADEMARK OFFICE
CERTIFICATE OF CORRECTION

PATENT NO. : Patent No. 4,859,876

DATED : August 22, 1989

INVENTOR(S) : C. W. Dirk, H. E. Katz, S. J. Lalama, K. D. Singer, J. E. Sohn

It is certified that error appears in the above-identified patent and that said Letters Patent is hereby corrected as shown below:

Column 13, line 20, "$\begin{smallmatrix}A\\B\end{smallmatrix}$" should read -- $\left(\begin{smallmatrix}A\\B\end{smallmatrix}\right)$ --.

Signed and Sealed this

Fourth Day of September, 1990

*Attest:*

HARRY F. MANBECK, JR.

*Attesting Officer*     *Commissioner of Patents and Trademarks*